United States Patent [19]
Strand et al.

[11] Patent Number: 5,373,749
[45] Date of Patent: Dec. 20, 1994

[54] VEHICLE HEAD RESTRAINT TESTER

[75] Inventors: Richard C. Strand, St. Bonifacius; Jay S. Warner, Shakopee, both of Minn.

[73] Assignee: MTS Systems Corporation, Eden Prairie, Minn.

[21] Appl. No.: 56,021

[22] Filed: Apr. 29, 1993

[51] Int. Cl.⁵ .......................................... G01M 19/00
[52] U.S. Cl. ............................................. 73/865.3
[58] Field of Search .................. 73/78, 79, 81, 82, 789, 73/790, 794, 795, 818, 821, 826, 834, 865.3, 865.4, 865.6, 866.4

[56] References Cited

PUBLICATIONS

United States Department of Transportation Federal Motor Vehicle Safety Standard No. 202 entitled "Head Restraints".

European Standard ECE Regulation 17 entitled "Uniform Provisions Concerning the Approval of Vehicles with Regard to the Seats, their Anchorages and Head restraints".

*Primary Examiner*—Robert Raevis
*Attorney, Agent, or Firm*—Westman, Champlin & Kelly

[57] ABSTRACT

A tester is disclosed that applies forces to selected portions of a vehicle seat. The tester includes force application members that are mounted for pivotal movement about a common pivot axis. Actuators connected to the force application members apply the forces to the selected portions of the back of the seat in either a simultaneous or sequential manner.

18 Claims, 3 Drawing Sheets

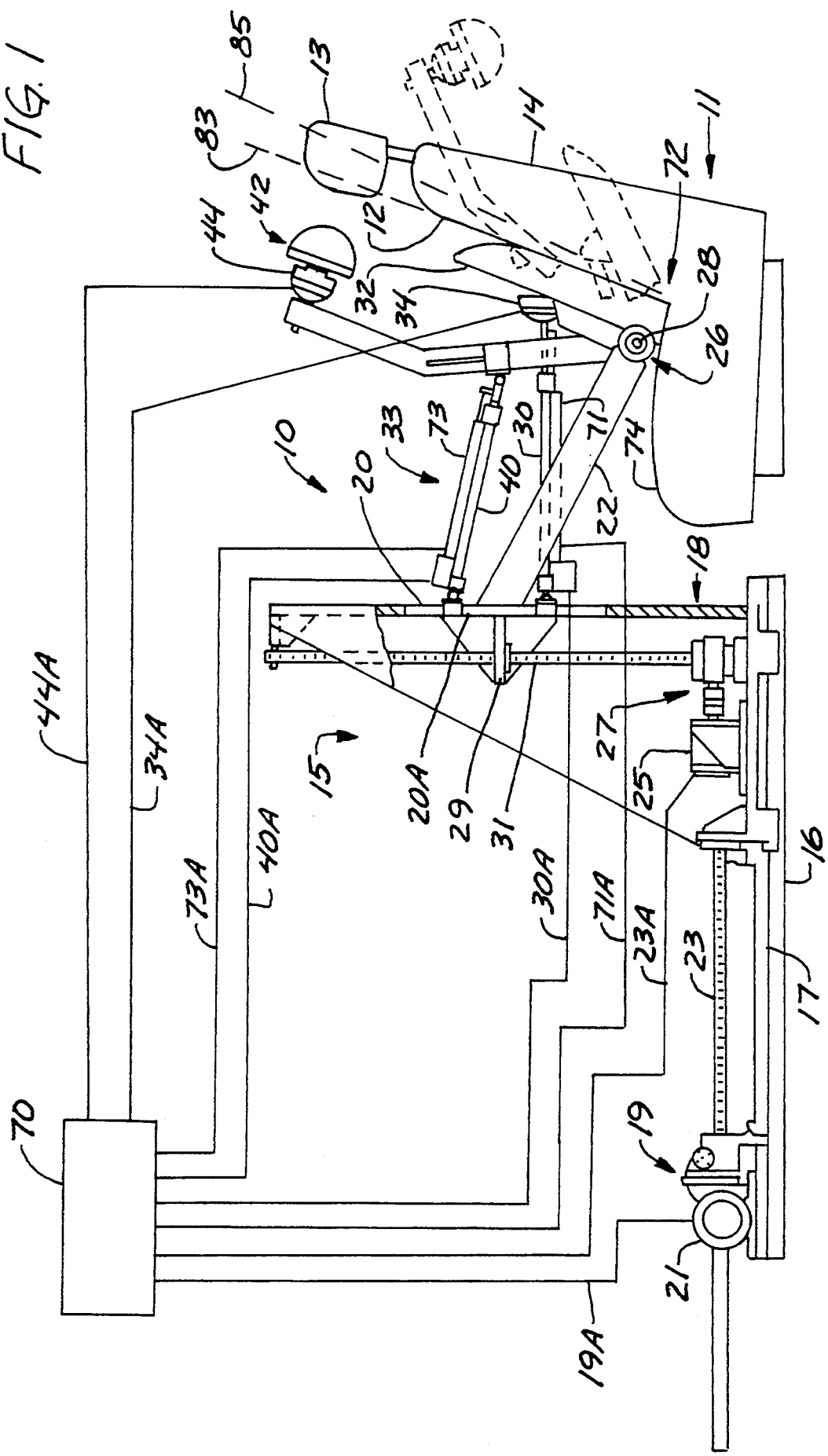

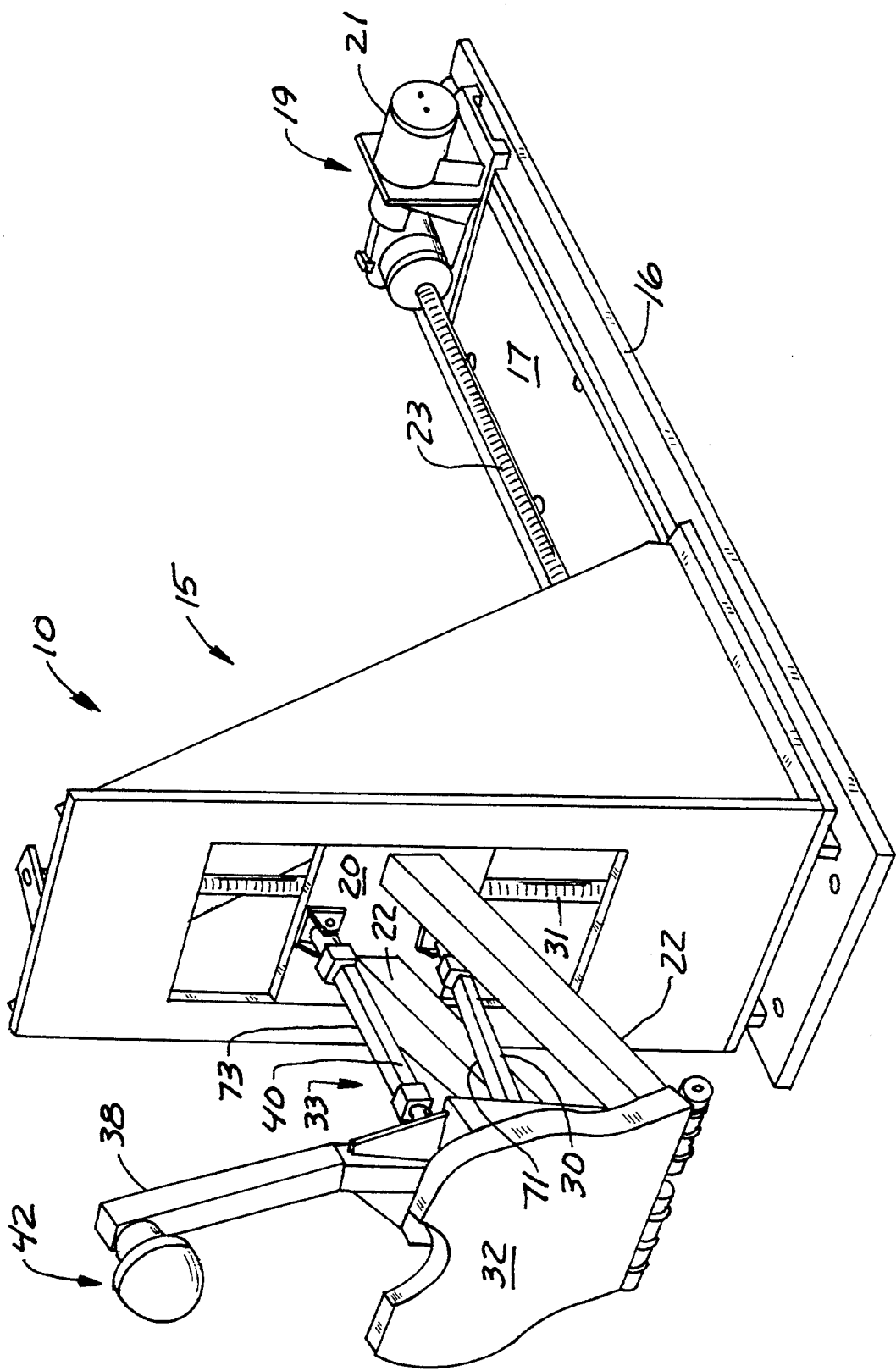

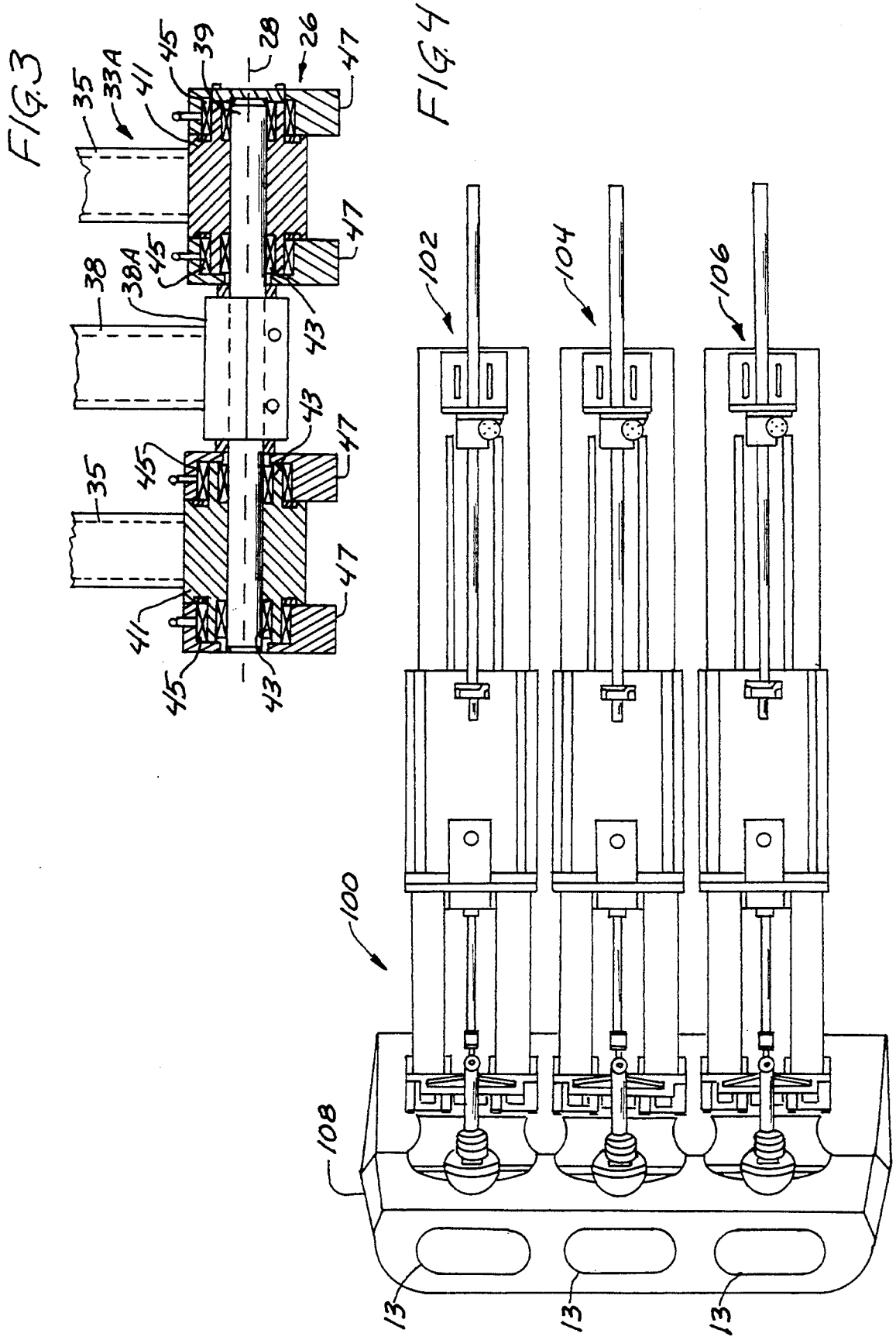

VEHICLE HEAD RESTRAINT TESTER

BACKGROUND OF THE INVENTION

The present invention relates to a machine for testing structural integrity of a seat and its head restraint. More particularly, a tester is disclosed for applying force loads to a back portion of a vehicle seat and measuring deflection thereof.

Motor vehicle seats must comply with structural integrity specifications mandated by governmental bodies. Commonly, the specifications are pursuant to required testing procedures. One such test procedure, determines the structural integrity of the back portion of a vehicle seat by applying isolated force loads to the front face of the seat back and head restraint and is set forth by the United States Department of Transportation as Federal Motor Vehicle Safety Standard No. 202. This test includes applying separate isolated loads to the lower back portion of the seat and the head restraint referenced to moments about a pivot axis that corresponds to hip-lower back connection joint of a human body, commonly called the "seat reference point" (SRP). The test is intended to simulate the types of forces the seat must withstand. Other countries require similar tests. For example, passenger car seats used in Europe must comply with European Standard ECE Regulation 17.

Although testers have been developed to perform these tests, often these testers require lengthy setup and operation times in order to provide the desired test results. As such, there exists a need for a seat head restraint tester that can be operated quickly and efficiently yet maintain required accuracy.

SUMMARY OF THE INVENTION

The present invention is a tester used to apply isolated force loads to selected locations on a seat. In the embodiment described, the forces are applied to a head restraint and seat back of a vehicle seat. The forces are applied to the head restraint and seat back by a force applying mechanism having two force application plates, which are controlled by suitable actuators. The force application plates are joined together for pivotal movement about a common pivot axis fixed relative to a support frame.

In a preferred embodiment, the frame has vertical and longitudinal adjustment assemblies each of which uses a motorized worm gear drive to allow the force applying mechanism to be properly positioned so that it mimics the human body, and more particularly the SRP placement, in a seated position.

A controller is also included in the preferred embodiment to make a test system capable of controlling the tester according to required test procedures (such as those stated above) and to receive measured test data. Such test data includes the force applied during the test as measured by load cells positioned between the actuators and the force application plates, and seat deflection as measured by suitable sensors positioned to measure angular movement of the force application plates relative to the pivot axis.

BRIEF DESCRIPTION OF THE DRAWINGS

FIG. 1 is a fragmentary side view of a tester of the present invention;

FIG. 2 is a perspective view of the tester;

FIG. 3 is an enlarged fragmentary sectional view of the tester; and

FIG. 4 is a top view of a plurality of testers of the present invention used for testing a seat having a plurality of seat positions.

DETAILED DESCRIPTION OF THE PREFERRED EMBODIMENTS

A tester 10 for applying isolated forces to a front face 12 of an upright portion, more commonly known as a seat back 14, of a vehicle seat 11, is illustrated in FIG. 1. The tester 10 applies the forces to the seat back 14 up to a predetermined limit or possibly a failure point during which measurements are taken and recorded. A determination is then made as to whether the seat passes or fails this force loading test. The test can be repeated separately on a head restraint 13, or alternatively, can be performed simultaneously on the seat back 14 and the head restraint 13.

Addressing each component of the tester 10 in detail, FIG. 1 illustrates a frame 15 having a fixed base 16. A support column 18 is selectively positionable relative to the base 16 being slidably mounted on a track 17 which is visible in FIG. 2. The support column 18 is displaced along the track 17 by a longitudinal adjustment mechanism such as a worm gear drive 19 using a suitable motor such as a hydraulic motor 21. A longitudinally threaded shaft 23 connects the support column 18 to the hydraulic motor 21 and controls displacement. The longitudinal adjustment mechanism thus allows the tester 10 to be positioned properly in front of the seat 11 to be tested.

Within the support column 18 is a movable plate 20. Attached to a back face 20A of the plate 20 is a vertical adjustment mechanism such as a second worm gear drive 27 using a second hydraulic motor 25. A vertical threaded shaft 31 connected to the worm gear drive 27 and the plate 20 through a threaded bracket 29 selectively drives the plate 20 to slide vertically in the support column 18. A force applying mechanism generally indicated at 33 and described in more detail below is joined to the moveable plate 20 with support arms 22. Selected placement of the plate 20 relative to the support column 18 thereby controls vertical placement of the force applying mechanism 33 in front of the front face 12.

The force applying mechanism 33 applies isolated forces to the seat 11 and includes a torso plate or backpan 32 and a head restraint force member 42. Preferably, the backpan 32 is shaped to simulate the human back, while the head restraint force member 42 has an outer curvature to simulate the human head. The backpan 32 and head restraint force member 42 are connected together to form a hinge 26, wherein each member moves independently about a common pivot axis 28.

Referring to FIG. 3, the hinge 26 includes a pan connector 33A having support brackets 35 joined to the backpan 32, and an extension arm 38 connected to the head restraint force member 42. The extension arm 38 is mounted to a pivot shaft 39 with a collar 38A. Each support bracket 35 is fastened to a pivot housing 41. Inner bearings 43 are positioned between the pivot housings 41 and the pivot shaft 39, while outer bearings 45 are positioned between the pivot housings 41 and support blocks 47 that are joined to the support arms 22. The support arms 22 thus fix placement of the pivot shaft 39 thereby fixing the pivot axis 28, whereas the bearings 43 and 45 allow independent pivotal movement of the support brackets 35 and the extension arm 38 about the pivot axis 28.

Referring to FIGS. 1 and 2, two force actuators 30,40 extend out from the plate 20. The first actuator 30 connects to the plate 20 and on an opposite end to a first load cell 34, which is attached to the backpan 32. The load cell 34 measures the force being applied by the actuator 30 to the seat back 14 and provides a proportional signal on signal line 34A to a controller 70. The second actuator 40 is also attached to the plate 20 and on an opposite end to a suitable location on the extension arm 38. Attached to the extension arm 38 between the second force application plate 42 and the extension arm 38 is a second load cell 44. The second load cell 44 measures the force applied from the actuator 40 and provides a signal proportional to the force applied to the head restraint 13 on a signal line 44A to the controller 70.

In the preferred embodiment, angular sensing devices are used to measure deflection of the seat 11 when a force is applied from either or both of the actuators 30 and 40. As exemplified, seat deflection is determined by measuring angular displacement of the backpan 32 and the extension arm 38. Referring to FIG. 1, each actuator 30 and 40 includes a linear sensor 71 and 73, respectively. The linear sensor 71 provides an output signal on signal line 71A to the controller 70 proportional to the length of the actuator 30. Similarly, the linear sensor 73 provides an output signal on signal line 73A proportional to the length of the actuator 40. Since the pivot shaft 39 is fixed relative to the frame 15, the controller 70 can accordingly determine the amount of deflection of either the backpan 32 or the extension arm 38 as a function of corresponding actuator length. It is understood that other angular sensing devices can also be used. For example, angular transducer devices having rotating measuring elements can be conventionally mounted to the hinge 26 to measure angular displacement of the support brackets 35 and extension arm 38 directly.

The force applying mechanism 33 is positioned using the controller 70 by providing suitable control signals on lines 19A and 23A to the vertical and longitudinal worm gear drives 19,27, respectively. The pivot axis 28 is positioned near a crevice 72 in the seat where the back 14 of the seat joins a seat base 74 of the seat which is where the SRP typically is situated. The ability to move the plate 20 and the support column 18 allows the force applying mechanism 33 to be properly positioned so that it may simulate a human being under typical use conditions for a given seat 11 to be tested. Thus, the pivot axis 28 will be positioned adjacent to the crevice 72 while the backpan 32 is positioned along the front face 12 of the seat back 14 thereby simulating a human back as it would be positioned in a manner perpendicular to the seat back 14 when the human is seated. Similarly, the head restraint force member 42 is positioned to contact the head restraint 13 and simulate the head of the human. In a preferred embodiment, the head restraint force member 42 is adjustably fixed to the extension arm 38 so that the head restraint force member 42 can be positioned to accommodate various head restraints 13 or positions thereof.

With the force applying mechanism 33 properly positioned, forces are applied to the seat with deflection thereof measured accordingly. In the embodiment illustrated, controller 70 provides control signals on signal lines 30A and 40A to control valves for the actuators 30 and 40, respectively. Each of the actuators operates independently so that forces may be placed upon the back portion 14 of the seat or the head restraint 13 following a predetermined test method either separately, or simultaneously. For example, following the Federal Motor Vehicle Safety Standard (FMVSS) No. 202, incorporated herein by reference, and with the force applying mechanism 33 properly positioned, an initial reference torso line 83 is determined from sensor 71. A specified force about the pivot axis 28 as measured by the load cell 34 is then applied using the actuator 30 to establish a displaced torso reference line 85, the angle of which is determined using sensor 71. The force from the backpan 32 is then removed. Using the actuator 40, extension arm 38 and the head restraint force member 42, the first-mentioned force about the pivot axis 28 is then applied to the head restraint 13. Corresponding deflection of the seat back 14 is recorded with sensor 73. The force from the actuator 40 is then increased to a second predetermined level with the corresponding deflection of the seat back 14 again recorded, or alternatively, until failure of either the seat back 14 or head restraint 13, upon which the measured applied force from the load cell 44 is recorded.

Other test standards can be performed such as European Standard ECE Regulation 17 where the force from the backpan 32 is maintained while the force from the head restraint force member 42 is applied. In the preferred embodiment, all desired testing procedures are stored within the controller 70. The controller 70 then controls setup and operation of the tester 10 based on command instructions from an operator, producing desired test results with minimized operator interaction.

FIG. 4 illustrates a test system 100 comprising a plurality of testers, herein indicated as 102, 104 and 106. Each tester 102, 104 and 106 is identical to the tester 10, described above, and preferably operated from a controller, not shown, to provide control signals and receive measured force and angle signals. The test system 100 is used to test seats wherein a seat 108 includes a plurality of seating positions. The design of the individual testers 102, 104 and 106 of the present invention allows placement adjacent one another to apply forces to simultaneously to each of the seat positions.

In summary, the present invention provides a convenient and efficient tester for testing vehicle seats. The tester includes a force applying mechanism comprising separate force members joined for pivotal movement about a common pivot axis. In preferred embodiments, angle measuring devices for measuring deflection of the seat, adjustment devices for adjusting the force applying mechanism to the seat to be tested, and a controller for automatically controlling the tester are added to make a test system. The test system reduces the time necessary to perform required tests on the seat, while maintaining if not improving the accuracy of the test results.

Although the present invention has been described with reference to preferred embodiments, workers skilled in the art will recognize that changes may be made in form and detail without departing from the spirit and scope of the invention.

What is claimed is:

1. A tester for applying forces to a back portion of a vehicle seat, the tester comprising:
   a frame; and force means connected to the frame for applying isolated forces to the back portion of the seat, the force means comprising:

first force applying means for applying a first force to a first portion of the back portion of the seat wherein the first force applying means is attached to the frame for pivotal movement about a pivot axis; and second force applying means for applying a second force to a second portion of the back portion of the seat isolated from the first mentioned force wherein the second force applying means is joined to the frame for pivotal movement about the pivot axis independent of the first force applying means during application of the second force.

2. The tester of claim 1 wherein the force means includes a pivot shaft, the first and second force applying means pivoting on the pivot shaft.

3. The tester of claim 2 wherein the pivot shaft pivots with the first force applying means.

4. The tester of claim 1 wherein the frame includes a fixed base and a support column adjustably attached to the fixed base wherein the force means is joined to the support column.

5. The tester of claim 4 wherein the support column includes a plate adjustably attached to the support column wherein the force means is joined to the plate.

6. The tester of claim 1 wherein the first force applying means includes a first actuator connected to the frame and a first force application member.

7. The tester of claim 6 wherein the second force applying means includes a second actuator connected to a second force application member.

8. The tester of claim 7 and further comprising force sensing means for measuring the first and second forces.

9. A tester of claim 8 wherein the force sensing means comprises a first force transducer connected between the first actuator and the first force application member and providing a first force output signal proportional to the first force, and a second force transducer connected between the second actuator and the second force application member and providing a second force output signal proportional to the second force.

10. The tester of claim 9 further comprising a controller connected to the first force transducer, the second force transducer and the force means, the controller receiving the first force output signal and the second force output signal and providing control signals to the force means.

11. The tester of claim 1 wherein the first portion of the back portion of the seat comprises a seat back of a vehicle seat and the second portion of the back portion of the seat comprises a head restraint connected to the seat back.

12. A tester for applying forces to a back portion of a seat having a plurality of seat positions, the tester comprising a plurality of force applying devices corresponding to each of the seat positions, each force applying device comprising:

a frame; and force means connected to the frame for applying isolated forces to the back portion of the seat corresponding to one of the seat positions, the force means comprising:

first force applying means for applying a first force to a first portion of the back portion of the seat wherein the first force applying means is attached to the frame for pivotal movement about a pivot axis; and second force applying means for applying a second force to a second portion of the back portion of the seat isolated from the first mentioned force wherein the second force applying means is attached to the frame for pivotal movement about the pivot axis independent of the first force applying means during application of the second force.

13. The tester of claim 12 wherein the force means includes a pivot shaft for each seat position, the first and second force applying means for each pivot position pivoting on the corresponding pivot shaft.

14. The tester of claim 12 wherein the frame includes a fixed base and a support column for each seat position adjustably attached to the fixed base wherein the force means for each seat position is joined to the corresponding support column.

15. The tester of claim 14 wherein each support column includes a plate adjustably attached to the support column, and wherein the force means for each seat position is joined to the corresponding plate.

16. A method of testing deflection of a back portion of a seat, the method comprising:

providing a frame with force means connected to the frame for applying two isolated forces to the back portion of the seat, the force means comprising a first force member and a second force member pivotally joined together for independent pivotal movement about a common pivot axis, the two isolated forces being referenced to the common pivot axis;

applying the two isolated forces to the seat using the force means, the first force member and the second force member pivoting during application of each corresponding force; and measuring forces applied to the seat and angular displacement of the seat.

17. The method of claim 16 wherein the step of applying comprises applying a first isolated force to a first location on the back portion of the seat; removing the first isolated force; and applying a second isolated force to a second location on the back portion of the seat.

18. The method of claim 16 wherein the step of applying comprises applying a first isolated force to a first location on the back portion of the seat and then applying a second isolated force to a second location on the back portion of the seat, while maintaining the first isolated force at the first location.

* * * * *